United States Patent Office 3,637,740
Patented Jan. 25, 1972

3,637,740
AMINOBENZOCYCLOALKANE COMPOUNDS
Reinhard Sarges, Mystic, Conn., assignor to
Pfizer Inc., New York, N.Y.
No Drawing. Filed Apr. 21, 1969, Ser. No. 818,056
Int. Cl. C07c 87/00; C07d 27/02
U.S. Cl. 260—326.5 M          18 Claims

ABSTRACT OF THE DISCLOSURE

Substituted 1,2,3,4 - tetrahydro-1-naphthylamines and substituted 1-aminoindanes, their acid addition salts and their racemic and d- and l- forms are useful in the field of mental health as anti-anxiety agents and/or as anti-depressants. N,N-dimethyl-5-methoxy-8-chloro-1,2,3,4-tetrahydro-1-naphthylamine and 1-(5-methoxy-8-acetyl-1,2,3,4-tetrahydro-1-naphthyl)pyrrolidine are preferred embodiments.

BACKGROUND OF THE INVENTION

This invention relates to new and useful 1-aminobenzocycloalkane compounds. More particularly, it is concerned with various novel substituted 1,2,3,4-tetrahydro-1-naphthylamines and substituted 1-aminoindanes and their acid addition salts, which are of value in view of their unique psychotherapeutic properties.

In the past, various attempts have been made by numerous investigators in this particular field of therapy to obtain new and improved agents for the treatment of mental depression and anxiety. In some instances, these efforts have involved the synthesis and testing of various compounds having the benzocycloalkane-type structure. For example, R. W. Temple et al. in U.S. Pat. No. 3,123,-642 show various 1-trialkylammonium benzocycloalkane salts that are reported to be useful in causing a selective block of the peripheral sympathetic (i.e., adrenergic) nervous system in animals (without affecting the peripheral parasympathetic nervous system or causing ganglion block), while in U.S. Pat. No. 3,201,470, C. F. Huebner discloses that certain 1-propargylaminotetralines are useful as stimulants or as psychic energizer agents due to their ability to act as monoamine oxidase inhibitors. However, little is known about the effect of other heretofore unavailable 1-aminobenzocycloalkanes in this area, particularly with respect to their effect on mental health and so on.

SUMMARY OF THE INVENTION

In accordance with the present invention, it has now been surprisingly found that various novel substituted 1-aminobenzocycloalkanes are extremely useful when employed in the field of drug therapy as psychotherapeutic agents despite the fact they do not function as monoamine oxidase inhibitors. The novel compounds of this invention are all selected from the group consisting of 1-aminobenzocycloalkane bases of the formula:

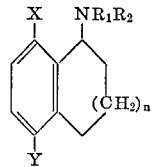

and the pharmaceutically-acceptable acid addition salts thereof, wherein X is a member selected from the group consisting of hydrogen, alkanoyl having from two to five carbon atoms, fluorine, chlorine and bromine; Y is a member selected from the group consisting of hydrogen, hydroxy, alkoxy and alkylthio each having up to three carbon atoms in the alkyl moiety, said Y only being hydrogen when X is other than hydrogen; $R_1$ and $R_2$ are each a member selected from the group consisting of hydrogen, alkyl having from one to three carbon atoms and when taken together with the nitrogen atom to which they are attached, complete a heterocyclic ring selected from the group consisting of pyrrolidine, piperidine, homopiperidine and N-alkylpiperazine having up to three carbon atoms in the alkyl moiety; and $n$ is an integer of from zero to one. Typical compounds include dl-N,N-dimethyl-5-methoxy-8-fluoro-1,2,3,4-tetrahydro-1-naphthylamine,
dl-N,N-dimethyl-5-methoxy-8-chloro-1,2,3,4-tetrahydro-1-naphthylamine,
dl-N,N-dimethyl-5-methoxy-8-acetyl-1,2,3,4-tetrahydro-1-naphthylamine,
dl-1-(5-methoxy-8-chloro-1,2,3,4-tetrahydro-1-naphthyl)pyrrolidine,
dl-1-(5-methoxy-8-acetyl-1,2,3,4-tetrahydro-1-naphthyl)pyrrolidine and
dl-1-N,N-dimethylamino-4-methoxy-7-chloroindane, as well as their d- and l- optical antipodes. These compounds are all useful in the chemotherapy of mental disease in view of their anti-anxiety and/or anti-depressant properties.

It is of especial interest in this connection that anti-anxiety activity has been found to reside in those optical isomers with the R-configuration, as contrasted with those of the S-configuration which are essentially concerned with the antidepressant effect. Thus, l-N,N-dimethyl-5-methoxy-8-chloro-1,2,3,4-tetrahydro-1-naphthylamine,
l-1-(5-methoxy-8-chloro-1,2,3,4-tetrahydro-1-naphthyl)pyrrolidine,
d-N-methyl-5-methoxy-8-chloro-1,2,3,4-tetrahydro-1-naphthylamine,
d-N-ethyl-5-methoxy-8-chloro-1,2,3,4-tetrahydro-1-naphthylamine,
l-1-(5-methoxy-1,2,3,4-tetrahydro-1-naphthyl)pyrrolidine,
l-1-(5-methoxy-8-acetyl-1,2,3,4-tetrahydro-1-naphthyl)pyrrolidine and
l-N-ethyl-5-methoxy-1,2,3,4-tetrahydro-1-naphthylamine are useful as anti-anxiety agents and their corresponding optical enantiomorphs of the S-configuration are useful as antidepressants. This is especially true in the case of the d- and l-optical isomers of N,N-dimethyl-5-methoxy-8-chloro-1,2,3,4-tetrahydro-1-naphthylamine, since the latter compound, upon resolution, has been shown to possess each of the aforementioned effects to a surprisingly significant degree and for a substantial period of time.

DETAILED DESCRIPTION OF THE INVENTION

In accordance with the processes employed for preparing the novel compounds of this invention, various alternate methods are provided depending upon the actual starting materials and/or intermediates utilized in this connection. For instance, a known 5-alkoxy-3,4-dihydro-1(2H)-naphthalenone, like 5 - methoxy-8-chloro-3,4-dihydro-1(2H)-naphthalenone [H. W. Huffman, Journal of Organic Chemistry, vol. 24, p. 1759 (1959)] can be reacted in the presence of titanium tetrachloride with an appropriate secondary amine of the formula $R_1R_2NH$, wherein $R_1$ and $R_2$ are each as previously defined, to give an intermediate enamine, which is then reduced either with formic acid, or with lithium borohydride in the presence of formic acid, to yield the desired final product, e.g., dl-N,N-dimethyl - 5 - methoxy-8-chloro-1,2,3,4-tetrahydro-1-naphthylamine. Conversely, when the initial condensation reaction is carried out with a primary amine of the formula $R_1NH_2$ and the resultant Schiff base is reduced with sodium borohydride, there is obtained a 5-alkoxy - 1,2,3,4 - tetrahydro - 1 - naphthylamine like dl-N-methyl-5-methoxy - 8 - chloro-1,2,3,4,-tetrahydro-1-naphthylamine, i.e., a secondary amine compound.

In like manner, when a known compound such as 5 - methoxy - 3,4 - dihydro-1(2H)-naphthalenone [see Chemical Abstracts, vol. 40, p. 8973 (1946)] is subjected to these same series of reactions, the corresponding final product obtained, e.g., dl-1-(5-methoxy - 1,2,3,4 - tetrahydro-1-naphthyl)pyrrolidine, lacks a substituent group at the 8-position of the molecule and can be further reacted with an appropriate alkanoyl halide of choice in the presence of aluminum chloride to give the corresponding 8-alkanoyl derivative thereof, i.e., a 5-alkoxy-8-alkanoyl-1,2,3,4-tetrahydro - 1 - naphthylamine compound like dl-N,N-dimethyl - 5 - methoxy - 8 - acetyl-1,2,3,4-tetrahydro-1-naphthylamine or dl-1-(5-methoxy - 8 - acetyl-1,2,3,4-tetrahydro-1-naphthyl)pyrrolidine.

On the other hand, a 5-alkoxy-3,4-dihydro-1(2H)-naphthalenone compound, such as 5 - methoxy-3,4-dihydro-1(2H) - naphthalenone, can be simply converted to its oxime via hydroxylamine and the latter intermediate reduced with hydrogen in the presence of a palladium-on-carbon catalyst to give the resultant primary amine, i.e., the corresponding 5-alkoxy-1,2,3,4-tetrahydro-1-naphthylamine compound. Bromination of the latter intermediate using ferric chloride as catalyst then affords the corresponding 8-bromo derivative, which, in turn, yields dl-N,N-dimethyl - 5 - alkoxy - 8 - bromo-1,2,3,4-tetrahydro-1-naphthylamine on treatment with excess formaldehyde in a formic acid medium and dl-1-(5-alkoxy-8-bromo-1,2,3,4 - tetrahydro - 1 - naphthylamine)pyrrolidine on treatment with 1,4-dibromobutane in the presence of a base such as sodium bicarbonate.

Alternatively, a compound like 5-methoxy-8-chloro-3,4-dihydro-1(2H)-naphthalenone or 4 - methoxy-7-chloro-1-indanone can be converted to its phenylhydrazone and the latter intermediate reduced with zinc dust and an acid such as acetic acid, to give the corresponding primary amine, which is a 5-alkoxy-8-chloro-1,2,3,4-tetrahydro-1-naphthylamine or 4 - alkoxy-7-chloro-1-indaneamine, as the case may be. When the latter type compound is then treated with an excess (e.g., at least a dimolar excess) of an alkylating agent such as ethyl iodide or with excess formaldehyde in formic acid, the final product obtained is the corresponding N,N-disubstituted compound like dl-N,N-diethyl-5-methoxy - 8 - chloro-1,2,3,4-tetrahydro-1-naphthylamine or dl-1-N,N-dimethylamino-4-methoxy-7-chloroindane, for instance. Ether cleavage of the latter type product with hydriodic acid to give the corresponding 5- or 4-hydroxy compound, followed by further treatment with an alkyl halide or sulfate alkylating agent then affords the appropriate 5-alkoxy-1,2,3,4-tetrahydro - 1 - naphthylamine (e.g., dl-N,N-diethyl-5-methoxy - 8 - chloro-1,2,3,4-tetrahydro-1-naphthylamine) or corresponding 1-amino-4-alkoxyindane depending, of course, on the actual nature of the reactant and reagent employed.

The starting materials employed for preparing the novel compounds of this invention are, for the most part, known compounds like 5-methoxy-3,4-dihydro-1(2H)-naphthalenone and its 8-chloro derivative, or else they are easily prepared by those skilled in the art from more readily available materials using conventional organic procedure. For instance, 4-methoxy-7-chloro-1-indanone is obtained by using the general method of L. F. Fieser et al., as described in the Journal of the American Chemical Society, vol. 74, p. 536 (1952), starting from the known 2-chloromethyl-4-chloroanisole. Other indanone starting materials are prepared in a similar manner.

Resolution of the racemic primary and/or secondary 1-aminobenzocycloalkane compounds of this invention is then accomplished in a conventional manner, using N-acetyl-L-tyrosine as the initial resolving agent therefor in a lower alcoholic solvent medium (e.g., methanol), whereby the less soluble diastereoisomeric salt is subsequently formed and isolated. Treatment of the alcoholic mother liquors obtained from above with D(—)mandelic acid then gives the corresponding diastereoisomeric salt of the other optical isomer. In this way, a compound such as dl-5-methoxy-8-chloro - 1,2,3,4 - tetrahydro-1-naphthylamine is ultimately separated into its respective d- and l-optical antipodes.

Conversion of the optically active forms of these compounds into still other derivatives encompassed by the scope of the present invention can then be readily effected by any number of standard procedures, as is more fully described elsewhere in the specification. For instance, l-5-methoxy - 8 - chloro-1,2,3,4-tetrahydro-1-naphthylamine affords d-1-(5-methoxy - 8 - chloro-1,2,3,4-tetrahydro-1-naphthyl)pyrrolidine on treatment with 1,4 - dibromobutane in the presence of base, while the latter intermediate then yields the corresponding 8-dehalo compound on hydrogenolysis in the presence of palladium-on-carbon. Acylation of the resulting d-1-(5-methoxy-1,2,3,4-tetrahydro-1-naphthyl)-pyrrolidine in the same manner as before with the dl-compound, then gives the corresponding 8-alkanoyl derivative e.g., d-l-(5-methoxy-8-acetyl-1,2,3,4-tetrahydro-1-naphthyl)pyrrolidine.

The acids which are used to prepare the pharmaceutically-acceptable acid addition salts of this invention are those which form non-toxic acid addition salts containing pharmacologically acceptable anions, such as the hydrochloride and sulfate, when reacted with the aforementioned 1 - amino-benzocycloalkane base compounds. Preferred acids for use in this connection include hydrochloric acid, hydrobromic acid, hydroiodic acid, nitric acid, sulfuric acid, phosphoric acid, acetic acid, lactic acid, citric acid, tartaric acid, oxalic acid, gluconic acid, saccharic acid, benzoic acid, succinic acid, maleic acid, methanesulfonic acid, ethanesulfonic acid, benzenesulfonic acid, p-toluenesulfonic acid, picric acid, amsonic acid (4,4'- diaminostilbene-2,2'-disulfonic acid) and pamoic acid (1,1'-methylene-bis-2-hydroxy-3-naphthoic acid).

As previously indicated, the 1-aminobenzocycloalkane compounds of this invention are valuable as psychotherapeutic agents, particularly in view of their potent antianxiety and antidepressant action. Hence, they are useful in the treatment of mental anxiety and certain related depressed states as well, with the optical isomers of the S-configuration being especially useful in this connection in view of their highly potent antidepresent action and lack of significant peripheral side effects. For instance, d-N,N-dimethyl - 5 - methoxy-8-chloro-1,2,3,4-tetrahydro-1-naphthylamine, a typical and preferred agent of the present invention, has been found to cause significant hyperactivity in rats when administered by the oral route, followed by a tetrabenazine challenge, without causing an untoward side effects to occur, such as increased nervous tension or irritability, even when administered to them for a period of several days. Further, the herein described compounds can be administered as psychotherapeutic agents by either the oral or parenteral routes of administration. In general, they are ordinarily administered in dosages ranging from about 0.3 mg. to about 10 mg. per kg. of body weight per day, although variations will necessarily occur depending upon the weight and condition of the subject being treated and the particular route of administration chosen.

In connection with the use of the 1-aminobenzocycloalkane compounds of this invention for the treatment of depressed subjects, it is to be noted that these compounds may be administered either alone or in combination with pharmaceutically acceptable carriers by either of the routes previously indicated, and that such administration can be carried out in both single and multiple dosages. More particularly, the novel compounds of this invention can be administered in wide variety of different dosage forms, i.e., they may be combined with various pharmaceutically-acceptable inert carriers in the form of tablets, capsules, lozenges, troches, hard candies, powders, sprays, aqueous suspension, injectable solutions, elixirs, syrups, and the like. Such carriers include solid diluents or fillers, sterile aqueous media and various non-toxic organic solvents, etc. Moreover, such oral pharmaceutical formulations can be suitably sweetened and/or flavored by means of various agents of the type commonly employed for just such purposes. In general, the therapeutically useful compounds of this invention are present in such dosage forms at concentration levels ranging from about 0.5% to about 90% by weight of the total composition, i.e., in amounts which are sufficient to provide the desired unit dosage previously indicated.

For purposes of oral administration, tablets containing various excipients such as sodium citrate, calcium carbonate and calcium phosphate may be employed along with various disintegrants such as starch and preferably potato or tapioca starch, alginic acid and certain complex silicates, together with binding agents such as polyvinylpyrrolidone, sucrose, gelatin and acacia. Additionally, lubricating agents such as magnesium stearate, sodium lauryl sulfate and talc are often very useful for tabletting purposes. Solid compositions of a similar type may also be employed as fillers in soft and hard-filled gelatin capsules; preferred materials in this connection would also include lactose or milk sugar as well as high molecular weight polyethylene glycols. When aqueous suspensions and/or elixirs are desired for oral administration, the essential active ingredient therein may be combined with various sweetening or flavoring agents, coloring matter or dyes and, if so desired, emulsifying and/or suspending agents as well, together with such diluents as water, ethanol, propylene glycol, glycerin and various like combinations thereof.

For purposes of parenteral administration, solutions of these particular 1-aminobenzocycloalkanes in sesame or peanut oil or in aqueous-propylene glycol or N,N-dimethylformamide may be employed, as well as sterile aqueous solutions of the corresponding water-soluble, non-toxic mineral and organic acid addition salts previously enumerated. Such aqueous solutions should be suitably buffered if necessary and the liquid diluent first rendered isotonic with sufficient saline or glucose. These particular aqueous solutions are especially suitable for intravenous, intramuscular, subcutaneous and intraperitoneal injection purposes. In this connection, the sterile aqueous media employed are all readily obtainable by standard techniques well-known to those skilled in the art.

EXAMPLE I

A solution consisting of 31.5 g. (0.15 mole) of 5-methoxy-8-chloro-3,4-dihydro-1(2H)-naphthalenenone [H. W. Huffman, Journal of Organic Chemistry, vol. 24, p. 1759 (1959)] dissolved in 600 ml. of ethanol was treated with 30 ml. of phenylhydrazine in the presence of 120 ml. of glacial acetic acid and the mixture thereafter heated on a steam bath for 30 minutes. Upon cooling, the resulting phenylhydrazone crystallized from solution and was subsequently collected by means of suction filtration to afford a nearly quantitative yield (45 g.) of the aforesaid derivative, M.P. 182-183° C.

Analysis.—Calcd. for $C_{17}H_{17}ClN_2O$ (percent): C, 67.87; H, 5.69; N, 9.32. Found (percent): C, 67.81; H, 5.79; N, 9.27.

The above phenylhydrazone (45 g., 0.15 mole) was then suspended in 2000 ml. of glacial acetic acid and the resulting suspension was thereafter treated with 111 g. of activated zinc dust, added in small portions during the course of a ten-minute period. The resulting reaction mixture was then stirred and heated to 70° C., and held at that point for three hours, followed by stirring at room temperature (~25° C.) for 20 hours. After filtering the spent mixture to remove excess zinc particles, the filtrate thus obtained was subsequently concentrated in vacuo to afford a residue that was then diluted with 500 ml. of water. The resulting aqueous solution was then adjusted to pH 4.5 with 6 N hydrochloric acid and extracted with three-200 ml. portions of diethyl ether to remove the aniline by-product. Upon rendering the aqueous layer strongly basic with 4 N sodium hydroxide solution, followed by extraction of the latter with three-300 ml. portions of diethyl ether, there were obtained ethereal extracts containing the desired free organic base compound. The latter were then combined with water and dried over anhydrous magnesium sulfate to give a dried filtrate that was subsequently concentrated under reduced pressure to afford a residual oil.

The oil, which consisted essentially of pure dl-5-methoxy - 8 - chloro-1,2,3,4-tetrahydro-1-naphthylamine, was then dissolved in diethyl ether and treated with dry hydrogen chloride gas to give the corresponding hydrochloride salt, M.P. 269-272° C. The yield of pure dl-5-methoxy-8-chloro-1,2,3,4-tetrahydro-1-naphthylamine hydrochloride amounted to 31.4 g. (82%), M.P. 272-273° C.

Analysis.—Calcd. for $C_{11}H_{14}ClNO \cdot HCl$ (percent): C, 53.24; H, 6.10; N, 5.65. Found (percent): C, 53.28; H, 6.13; N, 5.54.

EXAMPLE II

In a dry three-necked, round-bottomed reaction flask equipped with magnetic stirrer, internal thermometer and dropping funnel, there were placed a pre-cooled solution (0.5° C.) of 15.8 g. (0.075 mole) of 5-methoxy-8-chloro-3,4-dihydro-1(2H)-naphthalenone and 29.78 ml. (0.45 mole) of anhydrous dimethylamine in 225 ml. of benzene in accordance with the general procedure described by W. A. Wise et al. in the Journal of Organic Chemistry, vol. 32, p. 213 (1967) for the preparation of enamines. Stirring was then commenced, while 4.13 ml. (0.038 mole) of titanium tetrachloride in 25 ml. of benzene was slowly added to the aforesaid solution in a dropwise manner, while under a dry nitrogen atmosphere. During the addition, the temperature of the reaction mixture was kept below 10° C., while thereafterwards it was allowed to warm up slowly so as to attain room temperature (~25° C.). The resulting mixture was then stirred continuously at the latter point for a period of about 1-5 hours, i.e., until various aliquots showed almost complete conversion of the ketone to the enamine, as revealed by gas-liquid chromatographic analysis. At this point, the spent reaction mixture was filtered and the resulting solids twice slurried with 100 ml. portions of fresh benzene and filtered once again. The combined benzene filtrates were then evaporated under reduced pressure to give 18 g. of oily enamine, i.e., an almost quantitative yield of N,N-dimethyl - 5-methoxy-8-chloro-3,4-dihydro-1-naphthylamine.

To the above enamine, there were then added 14 ml. of 98% formic acid introduced in a dropwise manner and this, in turn, resulted in gas evolution and heat generation (in accordance with the general procedure described by M. J. Leonard et al. in the Journal of the American Chemical Society, vol. 79, p. 6210 (1957) for the reduction of enamines). The resulting reaction mixture was then stirred for 20 hours at room temperature (~25° C.) and thereafter diluted with 100 ml. of water. After adjusting the pH of the resulting aqueous solution to pH 1.0 with 6 N hydrochloric acid, it was subsequently washed by means of extraction with diethyl ether. The washed aqueous layer was then readjusted to pH 12 with 4 N sodium hydroxide solution and extracted three times with diethyl ether. The combined ether layer were then washed with water and dried over anhydrous magnesium sulfate. After removal of the drying agent by means of filtration, the dried ethereal filtrate was subsequently concentrated in vacuo to afford 14.5 g. (81%) of dl-N,N-dimethyl-5-methoxy - 8-chloro-1,2,3,4-tetrahydro-1-naphthylamine as a residual oily amine.

The above oil product was then treated with dry hydrogen chloride gas in diethyl ether to give 16.2 g. (78%) of the corresponding hydrochloride salt, M.P. 186-189° C. Recrystallization from methanol-acetone-diethyl ether then gave 11.96 g. (58%) of pure dl-N,N-dimethyl - 5-methoxy - 8-chloro-1,2,3,4-tetrahydro-1-naphthylamine hydrochloride, as the first crop of crystals, M.P. 191-193° C.

Analysis.—Calcd. for $C_{13}H_{18}ClNO \cdot HCl$ (percent): C, 56.54; H, 6.94; N, 5.08. Found (percent): C, 56.48; H, 6.96; N, 4.92.

EXAMPLE III

The procedure described in Example II was repeated except for the fact that pyrrolidine was employed instead of dimethylamine as the reagent of choice in this reaction. In this particular case, using the same molar proportions as before, 5 - methoxy-8-chloro-3,4-dihydro-1(2H)-naphthalenone was converted to 1 - (5-methoxy-8-chloro-3,4-dihydro-1-naphthyl)pyrrolidine, which, in turn, gave a 53% yield of dl-1-(5 - methoxy-8-chloro-1,2,3,4-tetrahydro-1-naphthyl)pyrrolidine on reduction with formic acid. Conversion to the hydrochloride salt, in the same manner as in the preceding example, then gave pure dl-1-(5-methoxy - 8-chloro-1,2,3,4-tetrahydro-1-naphthyl)pyrrolidine hydrochloride, M.P. 205–206° C.

*Analysis.*—Calcd. for $C_{15}H_{20}ClNO \cdot HCl$ (percent) C, 59.60; H, 7.01; N, 4.64. Found (percent): C, 59.62; H, 7.04; N, 4.63.

EXAMPLE IV

The procedure described in Example II was repeated again, only this time piperidine was employed as the reagent of choice instead of dimethylamine, using the same molar proportions as before. In this particular case, 1.25 g. of 5-methoxy-8-chloro-3,4-dihydro-1(2H)-naphthalenone was converted to 1.6 g. of 1-(5-methoxy-8-chloro - 3,4 - dihydro-1-naphthyl)piperidine, which, in turn, gave dl-1-(5 - methoxy - 8-chloro-1,2,3,4-tetrahydro-1-naphthyl)piperidine on reduction in 20 ml. of tetrahydrofuran with 500 mg. of lithium borohydride and 5 ml. of formic acid. Conversion to the corresponding hydrochloride salt in the same manner as before then gave 0.63 g. (35%) of dl-1-(5-methoxy-8-chloro-1,2,3,4-tetrahydro-1-naphthyl)piperidine hydrochloride, M.P. 122–125° C.

*Analysis.*—Calcd. for $C_{16}H_{22}ClNO \cdot HCl$ (percent): C, 60.75; H, 7.33; N, 4.43. Found (percent): C, 59.88; H, 7.38; N, 4.26.

EXAMPLE V

The procedure described in the preceding example was employed to prepare the N-methylpiperazine analog of the product of Example IV by merely using N-methylpiperazine as reagent in place of piperidine in the same reaction as before and on the same molar basis as well. In this particular case, 5 - methoxy - 8-chloro-3,4-dihydro-1(2H)-naphthalenone was converted to 1-(5-methoxy-8-chloro-3,4 - dihydro - 1 - naphthyl)-4-methylpiperazine, which, in turn, gave dl-1-(5-methoxy-8-chloro-1,2,3,4-tetrahydro-1-naphthyl) - 4-methylpiperazine on reduction with formic acid, followed by further treatment with lithium borohydride in tetrahydrofuran. Conversion to the hydrochloride salt then afforded pure dl-1-(5-methoxy-8-chloro-1,2,3,4-tetrahydro - 1 - naphthyl) - 4-methylpiperazine dihydrochloride, isolated as the semi-hydrate, M.P. 235–237° C.

*Analysis.* — Calcd. for $C_{16}H_{23}ClN_2O \cdot HCl \cdot 1/2H_2O$ (percent): C, 51.01; H, 6.96; N, 7.47. Found (percent): C, 51.58; H, 7.03; N, 7.40.

EXAMPLE VI

A solution of 10.5 g. (0.05 mole) of 5-methoxy-8-chloro-3,4-dihydro-1(2H)-naphthalenone in benzene was treated with 9.3 g. (0.03 mole) of methylamine and 2.75 ml. (0.025 mole) of titanium tetrachloride in accordance with the general procedure described by H. Weingarten et al. in the Journal of Organic Chemistry, vol. 32, p. 3246 (1967) to give 11.5 g. of the corresponding Schiff base, which represented an almost quantitative yield of said compound (i.e., approximately a 100% yield of N-methyl - 5 - methoxy - 8-chloro-3,4-dihydro-1(2H)-naphthalenoneimine.

The above intermediate base was then dissolved in 100 ml. of methanol, and 1.9 g. (0.05 mole) of sodium borohydride were slowly added to the resulting solution in small portions in accordance with the general reduction procedure described by J. H. Billman et al. in the Journal of Organic Chemistry, vol 22, p. 1068 (1957). Upon completion of this step, the reaction mixture was stirred for one-half hour at room temperature (~25° C.) and then evaporated to dryness under reduced pressure and worked-up as before to give 11 g. (98%) of dl-N-methyl-5-methoxy-8-chloro-1,2,3,4-tetrahydro-1-naphthylamine as residual oil.

The above oily product was then converted to the corresponding hydrochloride salt in the usual manner and there were ultimately obtained 10.8 g. (83%) of dl-N-methyl-5-methoxy-8-chloro-1,2,3,4-tetrahydro-1-naphthylamine hydrochloride M.P. 200–203° C. After further recrystallization from methanol-diethyl ether, the melting point of the pure salt was raised to 202–204° C. (yield, 10.0 g.).

*Analysis.*—Calcd. for $C_{12}H_{16}ClNO \cdot HCl$ (percent): C, 54.97; H, 6.54; N, 5.34. Found (percent): C, 54.92; H, 6.51; N, 5.37.

EXAMPLE VII

The procedure described in Example VI was repeated except that ethylamine was the starting reagent employed instead of methylamine. In this particular case, using the same molar proportions as before, 5-methoxy-8-chloro-3,4-dihydro-1(2H)-naphthalenone gave N-ethyl-5-methoxy-8-chloro-3,4-dihydro-1(2H)-naphthalenone imine as the intermediate, which, in turn, was converted to dl-N-ethyl-5-methoxy-8-chloro-1,2,3,4-tetrahydro-1-naphthylamine in 74% yield. Conversion to the corresponding hydrochloride salt in the usual manner then gave pure dl-N-ethyl-5-methoxy-8-chloro-1,2,3,4-tetrahydro-1-naphthylamine hydrochloride, M.P. 210–211° C.

*Analysis.*—Calcd. for $C_{13}H_{18}ClNO \cdot HCl$ (percent): C, 56.52; H, 6.93; N, 5.08. Found (percent): C, 56.58; H, 6.99; N, 5.18.

EXAMPLE VIII

The procedure described in Example VI was repeated except that isopropylamine was the starting reagent employed instead of methylamine. In this particular case, using the same molar proportions as before, 5-methoxy-8-chloro - 3,4 - dihydro-1(2H)-naphthalenone gave N-isopropyl - 5 - methoxy - 8 - chloro - 3,4 - dihydro - 1(2H)-naphthalenone imine as the intermediate, which, in turn, was ultimately converted to dl - N - isopropyl-5-methoxy-8-chloro-1,2,3,4-tetrahydro-1-naphthylamine hydrochloride, M.P. 231–234° C.

*Analysis.*—Calcd. for $C_{14}H_{20}ClNO \cdot HCl$ (percent): C, 57.93; H, 7.29; N, 4.83. Found (percent): C, 58.21; H, 7.40; N, 4.77.

EXAMPLE IX

A solution consisting of 2.4 g. (0.0094 mole) of dl-N-isopropyl-5-methoxy-8-chloro-1,2,3,4 - tetrahydro-1-naphthylamine (obtained by treatment of the corresponding hydrochloride in Example VIII with 10% aqueous sodium carbonate solution) dissolved in 25 ml. of formic acid was mixed with 25 ml. of 37% aqueous formaldehyde and the resulting mixture heated on the steam bath for a period of one-half hour. After isolating the desired product in the manner of Example II, there was obtained a 1.2 g. (49%) yield of dl-N-methyl-N-isopropyl-5-methoxy-8-chloro-1,2,3,4-tetrahydro-1-naphthylamine as the hydrobromide, M.P. 178–179° C.

*Analysis.*—Calcd. for $C_{15}H_{22}ClNO \cdot HBr$ (percent): C, 51.66; H, 6.64; N, 4.01. Found (percent): C, 51.68; H, 6.70; N, 3.83.

EXAMPLE X

A mixture consisting of 22 g. (0.105 mole) of dl-5-methoxy-8-chloro-1,2,3,4-tetrahydro-1-naphthylamine, 92 g. (1.10 mole) of sodium bicarbonate and 567 g. (3.65 mole) of ethyl iodide in 500 ml. of toluene was refluxed for 13 hours, followed by the addition of 46 g. of sodium bicarbonate and 275 g. of ethyl iodide to the resulting mixture and further refluxing for a period of seven more hours. At this point (after 20 hours of reflux), another 46 g. of sodium bicarbonate and 275 g. of ethyl iodide were added, and refluxing was resumed until a total time period of 48 hours had elapsed from the initial heating step. On cooling and filtering, followed by isolation of the desired product in the manner of Example II, there was ultimately obtained a 12.5 g. (40%) yield of dl-N,N-diethyl-5-methoxy-8-chloro-1,2,3,4-tetrahydro-1-naphthylamine hydrochloride in the form of a hydrate salt, M.P. 112–114° C.

Analysis.—Calcd. for $C_{15}H_{22}ClNO \cdot HCl \cdot H_2O$ (percent): C, 55.90; H, 7.83; N, 4.35. Found (percent): C, 55.72; H, 7.87; N, 4.44.

EXAMPLE XI

A mixture consisting 13.2 g. (0.048 mole) of dl-N,N-dimethyl-5-methoxy-8-chloro-1,2,3,4 - tetrahydro-1-naphthylamine hydrochloride (prepared as described in Example II), 48 ml. of glacial acetic acid and 59 ml. of 57% hydroiodic acid was refluxed for a period of five hours. At the end of this time, the reaction mixture was evaporated to dryness, while under reduced pressure, and the resulting residue recrystallized from methanol-diethyl ether to give 12.8 g. (76%) of dl-N,N-dimethyl-5-hydroxy-8-chloro-1,2,3,4-tetrahydro-1-naphthylamine as the hydriodide salt, M.P. 187–188° C.

Analysis.—Calcd. for $C_{12}H_{16}ClNO \cdot HI$ (percent): C, 40.74; H, 4.84; N, 3.96. Found (percent): C, 41.18; H, 4.89; N, 3.82.

EXAMPLE XII

To a solution consisting of 630 mg. (0.0018 mole) of dl-N,N-dimethyl-5-hydroxy - 8 - chloro-1,2,3,4-tetrahydro-1-naphthylamine hydriodide (prepared as described in the previous example) in 30 ml. of dimethylformamide, there was added 216 mg. (2.5 equivalents) of 50% sodium hydride (in mineral oil) and the resulting mixture stirred at room temperature ($\sim$25° C.) for 45 minutes and then at 50° C. for an additional 15 minutes. To the cooled mixture, there were then added dropwise 309 mg. of ethyl iodide during the course of a 15-minute period. After warming the resulting reaction mixture to 60° C. for an additional 1.5 hours, it was subsequently concentrated in vacuo and the basic product isolated therefrom in the manner of Example II to give 400 mg. (77%) of dl-N,N-dimethyl-5-ethoxy - 8 - chloro-1,2,3,4-tetrahydro-1-naphthylamine as the hydrochloride salt, M.P. 187–190° C.

Analysis.—Calcd. for $C_{14}H_{20}ClNO \cdot HCl$ (percent): C, 57.95; H, 7.30; N, 4.83. Found (percent): C, 58.01; H, 7.27; N, 4.84.

EXAMPLE XIII

To a solution consisting of 40 g. (0.227 mole) of 5-methoxy-3,4-dihydro-1(2H)-naphthalenone in 400 ml. of ethanol, there were added 25.6 g. of hydroxylamine hydrochloride, followed by a solution of 56 g. of anhydrous sodium acetate dissolved in 240 ml. of water. The resulting mixture was then heated on a steam bath for 20 minutes, cooled to room temperature ($\sim$25° C.) and the crystalline oxime subsequently collected on a filter funnel. In this manner, there was obtained a 43.2 g. (100%) yield of product melting at 156–158° C.

Hydrogenation of the above oxime (43.2 g.) in 400 ml. of glacial acetic acid with 4 g. of 10% palladium-on-carbon at 25° C. and 50 p.s.i. hydrogen pressure then gave the corresponding amine, which was subsequently isolated from the mixture first by means of filtration and then by evaporation of the resulting filtrate to dryness while under reduced pressure. Conversion of the residue to the hydrochloride salt in the usual manner then afforded 33.4 g. (70%) of pure dl-5-methoxy-1,2,3,4-tetrahydro-1-naphthylamine hyrochloride, M.P. 249–251° C.

Analysis.—Calcd. for $C_{11}H_{15}NO \cdot HCl$ (percent): C, 61.82; H, 7.53; N, 6.55. Found (percent): C, 61.93; H, 7.49; N, 6.78.

EXAMPLE XIV

To a solution of 6.42 g. (0.03 mole) of dl-5-methoxy-1,2,3,4-tetrahydro-1-naphthylamine hydrochloride (prepared as described in Example XIII) and 100 mg. of ferric chloride in 315 ml. of glacial acetic acid, there were added 1.6 ml. of bromine in a dropwise manner at 5–10° C. The resulting mixture was then stirred at room temperature ($\sim$25° C.) for two hours, followed by evaporation under reduced pressure. Trituration of the residue so obtained with 75 ml. of acetone then gave 7.83 g. (89%) of dl - 5 - methoxy-8-bromo-1,2,3,4-tetrahydro-1-naphthylamine hydrochloride in the form of a crystalline material, M.P. 262–264° C. Recrystallization from methanol-diethyl ether raised the melting point of the latter material to 274–275° C.

Analysis.—Calcd. for $C_{11}H_{14}BrNO \cdot HCl$ (percent): C, 45.10; H, 5.17; N, 4.79. Found (percent): C, 44.98; H, 5.21; N, 4.92.

EXAMPLE XV

A mixture consisting of 5.9 g. (0.02 mole) or dl-5-methoxy - 8 - bromo-1,2,3,4-tetrahydro-1-naphthylamine (obtained by treatment of the corresponding hydrochloride in Example XIV with 10% aqueous sodium carbonate solution), 100 ml. of 37% aqueous formaldehyde and 100 ml. of formic acid was heated on a steam bath for 15 hours. Upon isolating the desired product in the usual manner, there were ultimately obtained 1.5 g. (23%) of dl-N,N-dimethyl-5-methoxy-8-bromo-1,2,3,4-tetrahydro-1-naphthylamine as the hydrochloride salt, M.P. 176–178° C.

Analysis.—Calcd. for $C_{13}H_{18}BrNO \cdot HCl$ (percent): C, 48.60; H, 5.96; N, 4.37. Found (percent): C, 48.59; H, 6.04; N, 4.23.

EXAMPLE XVI

A solution of 5.9 g. (0.02 mole) or dl-5-methoxy-8-bromo-1,2,3,4-tetrahydro-1-naphthylamine in 35 ml. of toluene containing 4.24 g. (0.02 mole) of 1,4-dibromobutane was refluxed for a period of four hours. At the end of this time, 3.4 g. (0.04 mole) of sodium bicarbonate was added to the reaction mixture, followed by an additional reflux period of six hours. In this manner, [following the general procedure of R. B. Moffit, Journal of Organic Chemistry, vol. 14, p. 862, (1949)] there were ultimately obtained 1.37 g. (24%) of dl-1-(5-methoxy-8-bromo-1,2,3,4-tetrahydro-1-naphthyl)pyrrolidine as the hydrochloride salt, M.P. 198–199° C.

Analysis.—Calcd. for $C_{13}H_{18}BrNO \cdot HCl$ (percent): C, 51.95; H, 6.29; N, 4.06. Found (percent): C, 52.11. H, 6.29; H, 3.95.

EXAMPLE XVII

The procedure described in Example II was followed except that 5-methoxy-3,4-dihydro-1(2H)-naphthalenone was the starting material employed in place of the corresponding 8-chloro derivative. In this particular case, using the same molar proportions as before, 5-methoxy-3,4-dihydro-1(2H-naphthalenone was converted to N,N-dimethyl - 5-methoxy-3,4-dihydro-1-naphthylamine, which, in turn, gave dl-N,N-dimethyl-5-methoxy-1,2,3,4-tetrahydro-1-naphthylamine in 75% yield on reduction with formic acid. In this way, there was ultimately obtained pure dl - N,N - dimethyl-5-methoxy-1,2,3,4-tetrahydro-1-naphthylamine as the hydrochloride salt, M.P. 167–168° C.

Analysis.—Calcd. for $C_{13}H_{19}NO \cdot HCl$ (percent): C, 64.58; H, 8.34; N, 5.79. Found (percent): C, 64.12; H, 8.25; N, 5.69.

EXAMPLE XVIII

The procedure described in Example II was followed except that 5 - methoxy-3,4-dihydro-1(2H-naphthalenone was the starting material employed in the place of the corresponding 8-chloro derivative and pyrrolidine was the reagent used instead of dimethylamine. In this way, 5-methoxy-3,4-dihydro-1-(2H)-naphthalenone was converted to 1 - (5-methoxy-3,4-dihydro-1-naphthyl)pyrrolidine, which, in turn, gave dl-1-(5-methoxy-1,2,3,4-tetrahydro-1-naphthyl)pyrrolidine on reduction with formic acid. In this way, there was ultimately obtained pure dl-1-

(5 - methoxy-1,2,3,4-tetrahydro-1-naphthyl)pyrrolidine as the hydrochloride salt, M.P. 171–172° C.

*Analysis.*—Calcd. for $C_{15}H_{21}NO \cdot HCl$ (percent): C, 67.26; T, 8.28; N, 5.23. Found (percent): C, 67.03; H, 8.45; N, 5.15.

EXAMPLE XIX

To a solution consisting of 2.68 g. (0.01 mole) of *dl*-1 - (5-methoxy-1,2,3,4-tetrahydro-1-naphthyl)pyrrolidine hydrochloride (prepared as described in the previous example) in 40 ml. of nitrobenzene, there were added 3.68 g. (0.04 mole) of propionyl chloride and the resulting mixture cooled to 0° C. At this point, 5.32 g. (0.04 mole) of aluminum chloride were added to the mixture in small portions, with stirring, during the course of a 15-minute period and with the temperature always being maintained below 10° C. Upon completion of this step, the resulting mixture was stirred for 2.5 hours at room temperature (∼25° C.) to obtain a clear solution and the latter was subsequently poured onto a mixture of ice and 50 ml. of 6 N hydrochloric acid. After extracting first with two-250 ml. portions of diethyl ether to remove organic impurities, the aqueous layer was made basic to pH 10 and then extracted with three equal portions of diethyl ether. The combined ether extracts were subsequently dried over anhydrous magnesium sulfate, filtered and the resulting filtrate evaporated to dryness while under reduced pressure. The residue obtained in this manner was then recrystallized from diethyl ether to give 1.7 g. (60%) of pure *dl*-1-(5-methoxy - 8 - propionyl-1,2,3,4-tetrahydro-1-naphthyl)pyrrolidine, M.P. 96–97° C.

*Analysis.*—Calcd. for $C_{18}H_{25}NO$ (percent): C, 75.22; H, 8.77; N, 4.87. Found (percent): C, 75.00; H, 8.72; N, 4.84.

EXAMPLE XX

The procedure described in the previous example was repeated to prepare the corresponding 8-acetyl derivative of *dl* - 1-(5-methoxy-1,2,3,4-tetrahydro-1-naphtyl)pyrrolidine by merely employing acetyl chloride as reagent in place of propionyl chloride on the same molar basis as before. In this particular case, the corresponding product obtained was pure *dl*-1-(5-methoxy-8-acetyl-1,2,3,4-tetrahydro-1-naphthyl)pyrrolidine, M.P. 124–125° C.

*Analysis.*—Calcd. for $C_{17}H_{23}NO_2$ (percent): C, 74.69; H, 8.48; N, 5.12. Found (percent): C, 74.78; H; 8.71; N, 5.11.

EXAMPLE XXI

The procedure described in Example XIX was repeated to prepare the corresponding 8-n-butyl derivative of *dl*-1 - (5-methoxy-1,2,3,4-tetrahydro-1-naphthyl)pyrrolidine by merely employing of n-butyryl chloride as reagent in place of propionyl chloride on the same molar basis as before. In this particular case, the corresponding product obtained was pure *dl* - 1-(5-methoxy-8-n-butyryl-1,2,3,4-tetrahydro-1-naphthyl)pyrrolidine, M.P. 68–69° C.

*Analysis.*—Calcd. for $C_{19}H_{27}NO_2$ (percent): C, 75.71; H, 9.03; N, 4.65. Found (percent): C, 75.61; H, 9.22; N, 4.52.

EXAMPLE XXII

The procedure described in Example XIX was repeated to prepare the corresponding N,N-dimethyl compound, i.e., the 8-propionyl derivative of *dl*-N,N-dimethyl-5-methoxy-1,2,3,4-tetrahydro-1-naphthylamine, by merely substituting the product of Example XVII as substrate for the reaction in place of the starting material previously employed. In this particular case, using the same molar proportions as before, *dl*-N,N-dimethyl-5-methoxy-1,2,3,4-tetrahydro-1-naphthylamine hydrochloride was converted to pure *dl*-N,N-dimethyl-5-methoxy-8-propionyl-1,2,3,4-tetrahydro-1-naphthylamine, M.P. 74–75° C.

*Analysis.*—Calcd. for $C_{16}H_{23}NO_2$ (percent): C, 73.53; H, 8.87; N, 5.36. Found (percent): C. 73.50; H, 8.91; N, 5.39.

EXAMPLE XXIII

The procedure described in the previous example was repeated to prepare the corresponding 8-acetyl derivative of *dl*-N,N-dimethyl-5-methoxy-1,2,3,4-tetrahydro-1-naphthylamine by merely employing acetyl chloride in place of propionyl chloride on the same molar basis as before. In this particular case, the corresponding product obtained was pure *dl*-N,N-dimethyl - 5 - methoxy-8-acetyl-1,2,3,4-tetrahydro-1-naphthylamine, M.P. 115–116° C.

*Analysis.*—Calcd. for $C_{15}H_{21}NO$ (percent): C, 72.84; H, 8.56; N, 5.66. Found (percent): C, 72.80; H, 8.54; N, 5.62.

EXAMPLE XXIV

The procedure described in Example XXII was repeated to prepare the corresponding 8-n-butyryl derivative of *dl*-N,N-dimethyl-5-methoxy-1,2,3,4-tetrahydro - 1 - naphthylamine by merely employing n-butyryl chloride as reagent in place of propionyl chloride on the same molar basis as before. In this particular case, the corresponding product obtained was pure *dl*-N,N-dimethyl-5-methoxy-8-(n-butyryl)-1,2,3,4-tetrahydro-1-naphthylamine, M.P. 72–73° C.

*Analysis.*—Calcd. for $C_{17}H_{25}NO_2$ (percent): C, 74.14; H, 9.15; N, 5.09. Found (percent): C, 73.98; H, 9.27; N, 5.08.

EXAMPLE XXV

The procedure described in Example VII was repeated except that 5-methoxy-3,4-dihydro-1(2H)-naphthalenone was the starting material employed instead of the corresponding 8-chloro derivative. In this particular case, using the same molar proportions as before, 5-methoxy-3,4-dihydro-1(2H)-naphthalenone was converted to N-ethyl-5-methoxy-3,4-dihydro-1(2H)-naphthalenamine which, in turn, gave *dl*-N-ethyl - 5 - methoxy-1,2,3,4-tetrahydro-1-naphthylamine on subsequent reduction with sodium borohydride. In this way, there was ultimately obtained pure *dl*-N-ethyl - 5 - methoxy - 1,2,3,4 - tetrahydro-1-naphthylamine as the hydrochloride salt, M.P. 192–194° C.

*Analysis.*—Calcd. for $C_{13}H_{19}NO \cdot HCl$ (percent): C, 64.58; H, 8.34; N, 5.79. Found (percent): C, 64.33; H, 8.40; N, 5.68.

EXAMPLE XXVI

The following racemic 1-aminotetraline compounds were prepared in accordance with the procedures described in the previous examples:

*dl*-N,N-dimethyl-5-methoxy-8-fluoro-1,2,3,4-tetrahydro-1-naphthylamine, M.P. 186–188° C.

*dl*-1-(5-methoxy-8-fluoro-1,2,3,4-tetrahydro-1-naphthyl)pyrrolidine, M.P. 207–209° C.

*dl*-N,N-diethyl-5-methoxy-1,2,3,4-tetrahydro-1-naphthylamine, M.P. 174–176° C.

*dl*-1-(5-methoxy-8-isobutyryl-1,2,3,4-tetrahydro-1-naphthyl)pyrrolidine hydrochloride, M.P. 188–189° C.

*dl*-N,N-dimethyl-5-methoxy-8-(n-valeryl)-1,2,3,4-tetrahydro - 1 - naphthylamine hydrochloride, M.P. 158–159° C.

*dl*-N,N-dimethyl-5-methoxy-8-isovaleryl-1,2,3,4-tetrahydro-1-naphthylamine hydrochloride, M.P. 153–155° C.

*dl*-N,N-dimethyl-5-methoxy-8-isobutyryl-1,2,3,4-tetrahydro-1-naphthylamine, M.P. 69–70° C.

*dl*-1-(5-methoxy-8-n-valeryl-1,2,3,4-tetrahydro-1-naphthyl)pyrrolidine hydrochloride, M.P. 154–155° C.

*dl*-1-(5-methoxy-8-isovaleryl-1,2,3,4-tetrahydro-1-naphthyl)pyrrolidine hydrochloride, M.P. 177–178° C.

EXAMPLE XXVII

The procedure described in Example I was followed except that 2.6 g. of 4-methoxy-7-chloro-1-indanone, M.P. 123–124° C., was the starting material employed to react with phenylhydrazine instead of the corresponding dihy-

13 dronaphthalenone [the aforementioned indanone was obtained by the general method of L. F. Fieser et al., Journal of the American Chemical Society, vol. 74, p. 536 (1952), starting from 2-chloromethyl-4-chloroanisole]. In this particular case, the corresponding phenylhydrazone was obtained in almost quantitative yield and the product melted at 162–165° C.

*Analysis.*—Calcd. for $C_{16}H_{15}ClN_2O$ (percent): C, 67.02; H, 5.27; N, 9.77. Found (percent): C, 67.36; H, 5.39; N, 9.67.

Subsequent treatment of the above phenylhydrazone with zinc dust in glacial acetic acid, in the manner of Example I, then gave *dl*-4-methoxy-7-chloro-1-indaneamine, obtained as the hydrochloride salt, M.P. 275–277° C.

*Analysis.*—Calcd. for $C_{10}H_{12}ClNo \cdot HCl$ (percent): N, 5.98. Found (percent): N, 5.77.

EXAMPLE XXVIII

The procedure described in Example IX was repeated except that *dl*-4-methoxy-7-chloro-1-indaneamine (obtained by treatment of the corresponding hydrochloride of Example XXVII with 10% aqueous sodium carbonate solution) was the starting material employed to react with excess formaldehyde in a formic acid medium. In this particular case, the corresponding final product obtained was *dl*-1-N,N-dimethyl-4-methoxy - 7 - chloroindane, isolated as the hydrochloride, M.P. 186–188° C.

*Analysis.*—Calcd. for $C_{12}H_{16}NO \cdot HCl$ (percent): C, 54.97; H, 6.54; N, 5.34. Found (percent): C, 54.72; H, 6.42; N, 5.47.

EXAMPLE XXVIIIA

The procedure described in Example II was repeated except that 7-chloro-1-indanone [known compound, prepared according to the method of L. F. Fieser et al., as described in the Journal of the American Chemical Society, vol. 74, p. 536 (1952)] was the starting material employed in place of 5-methoxy-8-chloro-3,4-dihydro-1(2H)-naphthalenone. In this particular case, using the same molar proportions as before, 7-chloro-1-indanone (1.66 g.) was ultimately converted to *dl*-1-N,N-dimethylamino-7-chloroindane, isolated as the hydrochloride hemihydrate (yield, 0.44 g.), M.P. 123–130° C.

*Analysis.*—Calcd. for $C_{11}H_{14}ClN \cdot HCl \cdot \frac{1}{2}H_2O$ (percent): C, 54.79; H, 6.69; N, 5.80. Found (percent): C, 54.75; H, 6.71; N, 5.65.

EXAMPLE XXIX

Ten parts by weight of *dl*-N,N-dimethyl-5-methoxy-8-chloro-1,2,3,4 - tetrahydronaphthylamine hydrochloride in 50 parts by volume of water is neutralized with 10 N aqueous sodium hydroxide solution. Extraction of the resulting aqueous solution with several portions of methylene chloride, followed by separation of the organic layer and its subsequent concentration under reduced pressure then affords pure *dl*-N,N-dimethyl-5-methoxy-8-chloro-1,2,3,4-tetrahydronaphthylamine as a free organic base compound.

In like manner, when any of the other 1-aminobenzocycloalkane salts of this invention, like *dl*-1-(5-methoxy-8-acetyl-1,2,3,4-tetrahydro-1-naphthyl)pyrrolidine hydrochloride of Example XX, for instance, are each individually subjected to this very same reaction procedure, the corresponding free organic base compound is always the final product thus obtained.

EXAMPLE XXX

The following racemic 1-aminobenzocycloalkanes are prepared by employing the procedures described in the previous examples, starting from readily available materials in each instance:

14

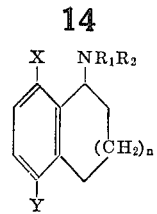

| X | Y | $R_1$ | $R_2$ | n |
|---|---|---|---|---|
| H | OH | H | H | 0 |
| F | $OCH_3$ | H | $CH_3$ | 1 |
| Cl | $OC_2H_5$ | H | $C_2H_5$ | 0 |
| Br | $OC_3H_7(n)$ | H | $n\text{-}C_3H_7$ | 1 |
| $CH_3CO$ | $OC_3H_7(iso)$ | H | $iso\text{-}C_3H_7$ | 0 |
| $C_2H_5CO$ | $SCH_3$ | $CH_3$ | $CH_3$ | 1 |
| $n\text{-}C_3H_7CO$ | $SC_2H_5$ | $C_2H_5$ | $C_2H_5$ | 0 |
| $iso\text{-}C_3H_7CO$ | $SC_3H_7(n)$ | $n\text{-}C_3H_7$ | $n\text{-}C_3H_7$ | 1 |
| $n\text{-}C_4H_9CO$ | $SC_3H_7(iso)$ | $iso\text{-}C_3H_7$ | $iso\text{-}C_3H_7$ | 0 |
| $iso\text{-}C_4H_9CO$ | OH | $CH_3$ | $C_2H_5$ | 1 |
| Br | $OCH_3$ | $CH_3$ | $n\text{-}C_3H_7$ | 0 |
| Cl | $OC_2H_5$ | $CH_3$ | $iso\text{-}C_3H_7$ | 1 |
| F | $OC_3H_7(n)$ | $C_2H_5$ | $n\text{-}C_3H_7$ | 0 |
| H | $OC_3H_7(iso)$ | $C_2H_5$ | $iso\text{-}C_3H_7$ | 1 |
| $CH_3CO$ | $SCH_3$ | H | H | 0 |
| $C_2H_5CO$ | $SC_2H_5$ | $-CH_2CH_2CH_2CH_2-$ | | 1 |
| $n\text{-}C_3H_7CO$ | $SC_3H_7(n)$ | $-CH_2CH_2CH_2CH_2CH-$ | | 0 |
| $iso\text{-}C_4H_9CO$ | $SC_3H_7(iso)$ | $-CH_2CH_2CH_2CH_2CH_2-$ | | 1 |
| $n\text{-}C_4H_9CO$ | OH | $-CH_2CH_2N(CH_3)CH_2CH_2-$ | | 0 |
| $iso\text{-}C_3H_7CO$ | $OCH_3$ | $-CH_2CH_2N(C_2H_5)CH_2CH_2-$ | | 1 |
| H | $OC_2H_5$ | $-CH_2CH_2N(n\text{-}C_3H_7)CH_2CH_2-$ | | 0 |
| F | $OC_3H_7(n)$ | $-CH_2CH_2N(iso\text{-}C_3H_7)CH_2CH_2-$ | | 1 |
| Cl | $OC_3H_7(iso)$ | $-CH_2CH_2CH_2CH_2-$ | | 0 |
| Br | $SCH_3$ | $-CH_2CH_2CH_2CH_2CH_2-$ | | 1 |
| $iso\text{-}C_4H_9CO$ | $SC_2H_5$ | $-CH_2CH_2CH_2CH_2CH_2CH_2-$ | | 0 |
| $n\text{-}C_4H_9CO$ | $SC_3H_7(n)$ | $-CH_2CH_2N(CH_3)CH_2CH_2-$ | | 1 |
| $n\text{-}C_3H_7CO$ | $SC_3H_7(iso)$ | $-CH_2CH_2N(C_2H_5)CH_2CH_2-$ | | 0 |
| $iso\text{-}C_3H_7CO$ | OH | $-CH_2CH_2N(n\text{-}C_3H_7)CH_2CH_2-$ | | 1 |
| $C_2H_5CO$ | $OCH_3$ | $-CH_2CH_2N(iso\text{-}C_3H_7)CH_2CH_2-$ | | 0 |
| $CH_3CO$ | $OC_2H_5$ | $-CH_2CH_2CH_2CH_2-$ | | 1 |
| Br | $OC_3H_7(n)$ | $-CH_2CH_2CH_2CH_2CH_2-$ | | 0 |
| Cl | $OC_3H_7(iso)$ | $-CH_2CH_2CH_2CH_2CH_2CH_2-$ | | 1 |
| F | $SCH_3$ | $-CH_2CH_2N(CH_3)CH_2CH_2-$ | | 0 |
| H | $SC_2H_5$ | $-CH_2CH_2N(C_2H_5)CH_2CH_2-$ | | 1 |
| F | H | H | $CH_3$ | 1 |
| Cl | H | H | $C_2H_5$ | 0 |
| Br | H | H | $n\text{-}C_3H_7$ | 1 |
| $CH_3CO$ | H | H | $iso\text{-}C_3H_7$ | 0 |
| $C_2H_5CO$ | H | $CH_3$ | $CH_3$ | 1 |
| $n\text{-}C_3H_7CO$ | H | $C_2H_5$ | $C_2H_5$ | 0 |
| $iso\text{-}C_3H_7CO$ | H | $n\text{-}C_3H_7$ | $n\text{-}C_3H_7$ | 1 |
| $n\text{-}C_4H_9CO$ | H | $iso\text{-}C_3H_7$ | $iso\text{-}C_3H_7$ | 0 |
| $iso\text{-}C_4H_9CO$ | H | $CH_3$ | $C_2H_5$ | 1 |
| Br | H | $CH_3$ | $n\text{-}C_3H_7$ | 0 |
| Cl | H | $CH_3$ | $iso\text{-}C_3H_7$ | 1 |
| F | H | $C_2H_5$ | $n\text{-}C_3H_7$ | 0 |
| $CH_3CO$ | H | H | H | 0 |
| $C_2H_5CO$ | H | $-CH_2CH_2CH_2CH_2-$ | | 1 |
| $n\text{-}C_3H_7CO$ | H | $-CH_2CH_2CH_2CH_2-$ | | 0 |
| $iso\text{-}C_3H_7CO$ | H | $-CH_2CH_2CH_2CH_2CH_2CH_2-$ | | 1 |
| $n\text{-}C_4H_9CO$ | H | $-CH_2CH_2N(CH_3)CH_2CH_2-$ | | 0 |
| $iso\text{-}C_3H_7CO$ | H | $-CH_2CH_2N(C_2H_5)CH_2CH_2-$ | | 1 |
| F | H | $-CH_2CH_2N(n\text{-}C_3H_7)CH_2CH_2-$ | | 0 |
| Cl | H | $-CH_2CH_2N(iso\text{-}C_3H_7)CH_2CH_2-$ | | 1 |
| Br | H | $-CH_2CH_2CH_2CH_2-$ | | 0 |
| $CH_3CO$ | H | $-CH_2CH_2CH_2CH_2-$ | | 1 |
| $n\text{-}C_4H_9CO$ | H | $-CH_2CH_2CH_2CH_2CH-$ | | 0 |
| Br | H | $-CH_2CH_2N(n\text{-}C_3H_7)CH_2CH_2-$ | | 1 |
| Cl | H | $-CH_2CH_2CH_2CH_2-$ | | 0 |
| F | H | $-CH_2CH_2CH_2CH_2CH_2-$ | | 1 |

EXAMPLE XXXI

A solution consisting of 25.6 g. (0.115 mole) of *dl*-5-methoxy - 8 - chloro - 1,2,3,4-tetrahydro-1-naphthylamine (prepared as described in Example I) and 12.8 g. (0.0574 mole) of N-acetyl-L-tyrosine dissolved in 25 ml. of warm methanol (previously heated to the boiling point prior to solution) was stirred and then allowed to cool slowly to room temperature (~25° C.). After standing overnight at this tempearture for approximately 16 hours, white crystals were observed to form. These crystals (24.7 g.) were then separated from the mother liquor (which was saved) by means of suction filtration and subsequently recrystallized from methanol-diethyl ether to give 21.5 g. of pure *l*-5-methoxy-8-chloro-1,2,3,4-tetrahydro-1-naphthylamine N-acetyl-L-tyrosinate, M.P. 178–185° C. Upon conversion to the corresponding hydrochloride salt, there was obtained a 10.4 g. (73%) yield of *l*-5-methoxy-8-chloro-1,2,3,4-tetrahydro-1-naphthylamine hydrochloride, M.P. 293–293.5° C.; $[\alpha]_D^{25°}$ —36° (c.=1, methanol).

The mother liquor obtained from above was then concentrated to near dryness while under reduced pressure and the resulting residue subsequently dissolved in 20 ml. of methanol. The latter methanolic solution was then treated with 8.8 g. of D(—)mandelic acid (1-mandelic acid). This particular reaction mixture was next heated to obtain a clear solution, followed by the addition of 20 ml. of diethyl ether thereto after first cooling down to room temperature (~25° C.). Upon standing overnight for approximately 16 hours, crystals were observed to form and these were subsequently collected by means of suction filtration and later recrystallized from methanol-diethyl ether to give 14.7 g. of pure $d$-5-methoxy-8-chloro - 1,2,3,4-tetrahydro-1-naphthylamine-$l$-mandelate, M.P. 174–180° C. After conversion to the hydrochloride salt in the same manner as was done with the previous diastereoisomer, there was ultimately obtained an 8.8 g. (62% yield) of $d$-5-methoxy-8-chloro-1,2,3,4-tetrahydro-1-naphthylamine hydrochloride, M.P. 293–293.5° C., $[\alpha]_D^{25°}+33°$ (c.=1, methanol).

EXAMPLE XXXII

A mixture consisting of 2.1 g. (0.01 mole) of $l$-5-methoxy-8-chloro-1,2,3,4-tetrahydro-1-naphthylamine (obtained by treatment of the corresponding hydrochloride in Example XXXI with 10% aqueous sodium carbonate solution), 25 ml. of formic acid and 25 ml. of 37% aqueous formaldehyde was heated on a steam bath for 30 minutes. Upon isolating the desired product in the usual manner, there was obtained a 2.0 g. (73%) yield of $d$-N,N - dimethyl - 5-methoxy-8-chloro-1,2,3,4-tetrahydro-1-naphthylamine as the hydrochloride, M.P. 198–198.5° C.; $[\alpha]_D^{25°}+34°$ (c.=1, in methanol).

In like manner, $d$-5-methoxy-8-chloro,1,2,3,4-tetrahydro-1-naphthylamine, as the free base, was reacted with formic acid and 37% aqueous formaldehyde to afford $l$-N,N - dimethyl-5-methoxy-8-chloro-1,2,3,4-tetrahydro-1-naphthylamine, obtained as the hydrochloride, M.P. 198–198.5° C.; $[\alpha]_D^{25°}-34°$ (c.=1, in methanol).

EXAMPLE XXXIII

A solution consisting of 2.1 g. (0.01 mole) of $l$-5-methoxy-8-chloro-1,2,3,4-tetrahydro-1-naphthylamine, as the free base, in 40 ml. of toluene was refluxed with 2.1 g. (0.01 mole) of 1,4-dibromobutane in the presence of 1.68 g. of sodium bicarbonate for approximately 16 hours overnight. Following the procedure of Example XV, there was ultimately obtained a 1.3 (39%) yield of $d$-1-(5 - methoxy-8-chloro-1,2,3,4-tetrahydro-1-naphthyl)pyrrolidine as the hydrochloride, M.P. 235–236° C.; $[\alpha]_D^{25°}-60°$ (c.=1, methanol).

In like manner, $d$-5-methoxy-8-chloro-1,2,3,4 - tetrahydro-1-naphthylamine was converted to $l$-1-(5-methoxy-8 - chloro - 1,2,3,4 - tetrahydro-1-naphthyl)-pyrrolidine, obtained as the hydrochloride, M.P. 235–236° C.; $[\alpha]_D^{25°}-64°$ (c.=1, methanol).

EXAMPLE XXXIV

A solution consisting of 2.0 g. (0.0067 mole) of $l$-1-(5-methoxy - 8 - chloro - 1,2,3,4 - tetrahydro - 1-naphthyl)-pyrrolidine hydrochloride dissolved in 20 ml. of methanol was hydrogenated by means of treatment with 2 g. of 10% palladium-on-carbon at 25° C. and atmosphere hydrogen pressure until no further hydrogen uptake could be observed (this required about 4.5 hours). At this point, an additional 1.0 g. of palladium-on-carbon was added to the mixture and hydrogenation was resumed for another two hours in order to ensure completeness of reaction. Upon completion of this step, the reaction mixture was filtered and the resulting filtrate concentrated in vacuo to afford 1.8 g. of an oily residue. The latter material was taken up in methanol and subsequently converted to the hydrochloride salt in the usual manner to afford 960 mg. of the laevo isomer, M.P. 154–157° C. Recrystallization from methanol-acetone then gave pure $l$-1-(5-methoxy-1,2,3,4-tetrahydro-1-naphthyl)pyrrolidine hydrochloride, M.P. 158–159° C.; $[\alpha]_D^{25°}-32°$ (c.=1, methanol).

In like manner, $d$-1-(5-methoxy-8-chloro-1,2,3,4-tetrahydro-1-naphthyl)pyrrolidine hydrochloride was converted to $d$-1-(5-methoxy-1,2,3,4-tetrahydro-1-naphthyl)-pyrrolidine hydrochloride, M.P. 158–159° C.; $[\alpha]_D^{25°}+33°$ (c.=1, methanol).

EXAMPLE XXXV

The acetylation procedure used in Example XX was repeated to prepare the corresponding $d$- and $l$-optical isomers of the 8-acetyl derivative of 1-(5-methoxy-1,2,3,4-tetrahydro-1-naphthyl)pyrrolidine, employing the products of Example XXXIV as the appropriate substrates. In this way, $d$-1-(5-methoxy-1,2,3,4-tetrahydro-1-naphthyl)-pyrrolidine hydrochloride was converted to $d$-1-(5-methoxy - 8 - acetyl - 1,2,3,4 - tetrahydro-1-naphthyl)-pyrrolidine, M.P. 136–137° C.; $[\alpha]_D^{25°}+84°$ (c.=1, methanol). Similarly, $l$-1-(5-methoxy-1,2,3,4-tetrahydro-1 - naphthyl)pyrrolidine hydrochloride gave $l$ - 1 - (5-methoxy - 8 - acetyl-1,2,3,4-tetrahydro-1-naphthyl)pyrrolidine, M.P. 136–137° C.; $[\alpha]_D^{25°}-84°$ (c.=1, methanol).

EXAMPLE XXXVI

The resolution procedure described in Example XXXI was repeated here to obtain the $d$- and $l$-forms of N-methyl - 5 - methoxy-8-chloro-1,2,3,4-tetrahydro-1-naphthylamine. In this particular case, $dl$-N-methyl-5-methoxy-8-chloro-1,2,3,4-tetrahydro-1-naphthylamine (prepared as described in Example VI) and N-acetyl-L-tyrosine ultimately gave $l$-N-methyl-5-methoxy-8-chloro-1,2,3,4-tetrahydro-1-naphthylamine hydrochloride, M.P. 198–199° C.; $[\alpha]_D^{25°}-16°$ (c.=1, methanol).

*Analysis.*—Calcd. for $C_{12}H_{16}ClNO \cdot HCl$ (percent): C, 54.97; H, 6.54; N, 5.35. Found (percent): C, 54.85; H, 6.52; N, 5.30.

In like manner, the use of D(—)mandelic acid on the mother liquors containing $d$ - N - methyl - 5-methoxy-8-chloro-1,2,3,4-tetrahydro-1-naphthylamine ultimately afforded pure $d$ - N - methyl - 5-methoxy-8-chloro-1,2,3,4-tetrahydro-1-naphthylamine hydrochloride, M.P. 198–199° C.; $[\alpha]_D^{25°}+15°$ (c.=1, methanol).

EXAMPLE XXXVII

The procedure described in Example XXXI is repeated again to prepare the $d$- and $l$-forms of N-ethyl-5-methoxy-8-chloro-1,2,3,4-tetrahydro-1-naphthylamine. In this particular case, $dl$ - N - ethyl - 5-methoxy-8-chloro-1,2,3,4-tetrahydro - 1 - naphthylamine (prepared as described in Example VII) and N-acetyl-L-tyrosine ultimately gave $l$ - N - ethyl - 5 - methoxy-8-chloro-1,2,3,4-tetrahydro-1-naphthylamine hydrochloride, M.P. 180–181° C.; $[\alpha]_D^{25°}-8°$ (c.=1, methanol).

*Analysis.*—Calcd. for $C_{13}H_{18}ClNO \cdot HCl$ (percent): C, 56.52; H, 6.93; N, 5.08. Found (percent): C, 56.43; H, 6.93; N, 5.03.

In like manner, the mother liquor after treatment with D(—)-mandelic acid ultimately gave pure $d$-N-ethyl-5-methoxy - 1,2,3,4 - tetrahydro - 1 - naphthylamine hydrochloride, M.P. 180–181° C.; $[\alpha]_D^{25°}+6°$ (c.=1, methanol).

EXAMPLE XXXVIII

Following the procedure of Example XXXI, the 1-aminobenzocycloalkanes listed below were obtained in the form their optically active $d$- and $l$-isomers by merely starting from the appropriate racemic compound ($dl$-form) in each case:

$d$ - N - ethyl-5-methoxy-1,2,3,4-tetrahydro-1-naphthylamine hydrochloride, M.P. 186–187° C.; $[\alpha]_D^{25°}+11°$ (c.=1, methanol).

$l$ - N - ethyl - 5 - methoxy-1,2,3,4-tetrahydro-1-naphthylamine hydrochloride, M.P. 186–187° C.; $[\alpha]_D^{25°}-25°$ (c.=1, methanol).

EXAMPLE XXXIX

The procedure described in Example XXIX is repeated here to obtain the pure $d$- and $l$-base compounds of the optically active 1-aminobenzocycloalkane salts reported previously in Examples XXXI–XXXVIII. In this way, $d$ - N,N - dimethyl-5-methoxy-8-chloro-1,2,3,4-tetrahydro-1-naphthylamine hydrochloride is converted d-N,N-dimethyl - 5 - methoxy - 8 - chloro - 1,2,3,4-tetrahydro-1-naphthylamine and l-N,N-dimethyl-5-methoxy-8-chloro-1,2,3,4-tetrahydro-1-naphthylamine hydrochloride is converted to l-N,N-dimethyl-5-methoxy-8-chloro-1,2,3,4-tetrahydro-1-naphthylamine. In like manner, when each of the other optically active hydrochlorides is subjected to this very same reaction procedure, the corresponding d- and l-free organic base compounds are the final product thus obtained.

EXAMPLE XL

The resolution procedure of Example XXXI is employed here to resolve the racemic primary and secondary 1-aminobenzocycloalkanes reported in Example XXX, whereby each and every one of the aforesaid dl-compounds listed in the table of said latter example are ultimately converted to their respective d- and l-optical antipodes.

EXAMPLE XLI

The non-toxic hydrohalide acid addition salts of each of the 1-aminobenzocycloalkane bases reported previously in the preceding examples, viz, the hydrochloride, hydrobromide, and hydriodide salts, are each individually prepared by first dissolving the respective organic base compound in absolute ether followed by the introduction of the appropriate hydrogen halide gas into the reaction solution until saturation of same is complete with respect to said gas, whereupon the desired salt precipitates from said solution. The crystalline products so obtained are then subsequently recrystallized from acetone-diethyl ether to yield the pure hydrohalide salt in each case. For instance, when 1.0 g. of dl - N,N - dimethyl - 5 - methoxy-8-chloro-1,2,3,4-tetrahydro-1-naphthylamine is dissolved in anhydrous diethyl ether and dry hydrogen bromine gas is subsequently passed into the resulting reaction solution until saturation of same is complete with respect to said gas, there is obtained a crystalline precipitate of dl-N,N-dimethyl - 5 - methoxy - 8 - chloro - 1,2,3,4-tetrahydro-1-naphthylamine hydrobromide.

EXAMPLE XLII

The nitrate, sulfate, phosphate, acid phosphate, acetate, lactate, citrate, acid citrate, tartrate, bitartrate, succinate, maleate, gluconate, saccharate, methanesulfonate ethanesulfonate, benzenesulfonate and p - toluenesulfonate salts of each of the 1-aminobenzocycloalkane bases previously described in Example XXX, and elsewhere in the specification, are all each individually prepared by separately dissolving in a suitable amount of ethanol the proper molar amounts of the respective acid and the appropriate organic base compound and then mixing the two solutions together, followed by the addition of diethyl ether to the resulting reaction solution in order to effect precipitation of the desired acid addition salt therefrom. For instance, when equivalent amounts of dl - 1 - (5 - methoxy-8-acetyl-1,2,3,4 - tetrahydro - 1 - naphthyl)-pyrrolidine and concentrated sulfuric acid react in accordance with this procedure, the corresponding final product obtained is dl-1-(5 - methoxy - 8 - acetyl - 1,2,3,4-tetrahydro-1-naphthyl) pyrrolidine hydrogen sulfate. In like manner, each of the other acid addition salts is similarly obtained.

EXAMPLE XLIII

A dry solid pharmaceutical composition is prepared by blending the following materials together in the proportions by weight specified below:

dl-N,N-dimethyl-5-methoxy-8-chloro - 1,2,3,4 - tetrahydro-1-naphthylamine hydrochloride _____ 50
Sodium citrate _____ 25
Alginic acid _____ 10
Polyvinylpyrrolidone _____ 10
Magnesium stearate _____ 5

After the dried composition is thoroughly blended, tablets are punched from the resulting mixture, each tablet being of such size that it contains 100 mg. of the active ingredient. Other tablets are also prepared in a similar fashion containing 5, 10, 25 and 50 mg. of the active ingredient, respectively, by merely using the appropriate amount of the 1-aminobenzocycloalkane salt in each case.

EXAMPLE XLIV

A dry solid pharmaceutical composition is prepared by combining the following materials together in the proportions by weight indicated below:

dl-1-(5-methoxy-8-acetyl-1,2,3,4-tetrahydro - 1 - naphthyl)pyrrolidine hydrogen sulfate _____ 50
Calcium carbonate _____ 20
Polyethylene glycol, average molecular weight 4000 __ 30

The dried solid mixture so prepared is then throughly agitated so as to obtain a powdered product that is completely uniform. Soft elastic and hard-filled gelatin capsules containing this pharmaceutical composition are then prepared, employing a sufficient quantity of material in each case so as to provide each capsule with 250 mg. of the active ingredient.

What is claimed is:
1. A compound selected from the group consisting of 1-aminobenzocycloalkane bases of the formula:

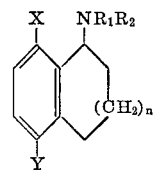

and the pharmaceutically acceptable acid addition salts thereof, wherein X is a member selected from the group consisting of alkanoyl having from two to five carbon atoms, fluorine, chlorine and bromine; Y is a member selected from the group consisting of hydrogen, hydroxy, alkoxy and alkylthio each having up to three carbon atoms in the alkyl moiety; $R_1$ and $R_2$ are each a member selected from the group consisting of hydrogen, alkyl having from one to three carbon atoms and when taken together with the nitrogen atom to which they are attached, complete a heterocyclic ring selected from the group consisting of pyrrolidine, piperidine, homopiperidine and N-alkylpiperazine having up to three carbon atoms in the alkyl moiety and $n$ is an integer of from zero to one.

2. A 1-aminobenzocycloalkane compound as claimed in claim 1 wherein $n$ is zero.

3. A 1-aminobenzocycloalkane compound as claimed in claim 1 wherein $n$ is one.

4. A compound as claimed in claim 2 wherein X is chlorine, Y is methoxy, and $R_1$ and $R_2$ are each methyl.

5. A compound as claimed in claim 3 wherein X is fluorine, Y is methoxy, and $R_1$ and $R_2$ are each methyl.

6. A compound as claimed in claim 3 wherein X is chlorine, Y is alkoxy having up to three carbon atoms, and $R_1$ and $R_2$ are each hydrogen.

7. A compound as claimed in claim 3 wherein X is chlorine, Y is alkoxy having up to three carbon atoms, and $R_1$ and $R_2$ are each alkyl having from one to three carbon atoms.

8. A compound as claimed in claim 3 wherein X is chlorine, Y is alkoxy having up to three carbon atoms, and $R_1$ and $R_2$ when taken together with the nitrogen atom to which they are attached, complete a pyrrolidine ring.

9. A compound as claimed in claim 3 wherein X is alkanoyl having from two to five carbon atoms, Y is alkoxy having up to three carbon atoms, and $R_1$ and $R_2$ are each alkyl having from one to three carbon atoms.

10. A compound as claimed in claim 3 wherein X is alkanoyl having from two to five carbon atoms, Y is alkoxy having up to three carbon atoms, and $R_1$ and $R_2$ when taken together with the nitrogen atom to which they are attached complete a pyrrolidine ring.

11. A compound as claimed in claim 3 wherein X is chlorine, Y is alkoxy having up to three carbon atoms, $R_1$ is hydrogen and $R_2$ is alkyl having from one to three carbon atoms.

12. A compound as claimed in claim 7 wherein X is chlorine, Y is methoxy, and $R_1$ and $R_2$ are each alkyl having from one to three carbon atoms.

13. A compound as claimed in claim 11 wherein X is chlorine, Y is methoxy, $R_1$ is hydrogen and $R_2$ is alkyl having from one to three carbon atoms.

14. A compound as claimed in claim 12 wherein $R_1$ and $R_2$ are each methyl.

15. A compound as claimed in claim 13 wherein $R_2$ is methyl.

16. A compound as claimed in claim 9 wherein X is acetyl, Y is methoxy, and $R_1$ and $R_2$ are each methyl.

17. A compound as claimed in claim 10 wherein X is acetyl and Y is methoxy.

18. A compound as claimed in claim 3 wherein X is fluorine, Y is methoxy and $R_1$ and $R_2$ when taken together with the nitrogen atom to which they are attached complete a pyrrolidine ring.

References Cited

Haworth et al., Chem. Abs., vol. 41, pp. 5095–5098 (1947).

ALEX MAZEL, Primary Examiner

J. A. NARCAVAGE, Assistant Examiner

U.S. Cl. X.R.

260—239 B, 293 R, 268 BC, 294.7 J, 294.7 M, 376.5 J, 326.8, 571, 575, 577, 578; 424—250, 267, 274, 330